United States Patent
Varda et al.

(10) Patent No.: US 11,853,776 B2
(45) Date of Patent: *Dec. 26, 2023

(54) CLOUD COMPUTING PLATFORM THAT EXECUTES THIRD-PARTY CODE IN A DISTRIBUTED CLOUD COMPUTING NETWORK

(71) Applicant: CLOUDFLARE, INC., San Francisco, CA (US)

(72) Inventors: Kenton Taylor Varda, Austin, TX (US); Zachary Aaron Bloom, San Francisco, CA (US); Marek Przemyslaw Majkowski, Warsaw (PL); Ingvar Stepanyan, London (GB); Kyle Kloepper, Champaign, IL (US); Dane Orion Knecht, Austin, TX (US); John Graham-Cumming, London (GB); Dani Grant, Los Altos, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/148,642

(22) Filed: Dec. 30, 2022

(65) Prior Publication Data
US 2023/0138161 A1  May 4, 2023

Related U.S. Application Data

(63) Continuation of application No. 17/114,382, filed on Dec. 7, 2020, now Pat. No. 11,561,805, which is a
(Continued)

(51) Int. Cl.
*G06F 9/448* (2018.01)
*H04L 67/00* (2022.01)
(Continued)

(52) U.S. Cl.
CPC ........ *G06F 9/4484* (2018.02); *G06F 9/45558* (2013.01); *G06F 21/53* (2013.01);
(Continued)

(58) Field of Classification Search
None
See application file for complete search history.

(56) References Cited

U.S. PATENT DOCUMENTS 8,244,874 B1 * 8/2012 Thireault .............. G06F 9/5055
709/226
9,009,286 B2 * 4/2015 Sivasubramanian ... H04L 67/55
709/224
(Continued)

*Primary Examiner* — Lashonda Jacobs-Burton
(74) *Attorney, Agent, or Firm* — NICHOLSON DE VOS WEBSTER & ELLIOTT LLP

(57) ABSTRACT

A compute server receives a first request from a client device that triggers execution of a first third-party code piece. The first request is directed to a first zone. A single process at the compute server executes the first third-party code piece. As a result of executing the first third-party code piece, a second request is generated that triggers execution of a second third-party code piece. The second request is directed to a second zone. The single process executes the second third-party code piece. A response is generated to the first request based at least in part on the executed first third-party code piece and the executed second third-party code piece. The generated response is transmitted to the client device.

21 Claims, 6 Drawing Sheets

Related U.S. Application Data continuation of application No. 16/450,585, filed on Jun. 24, 2019, now Pat. No. 10,860,340, which is a continuation of application No. 16/182,522, filed on Nov. 6, 2018, now Pat. No. 10,331,462.

(51) Int. Cl.

| | | |
|---|---|---|
| *H04L 67/02* | (2022.01) | |
| *H04L 67/10* | (2022.01) | |
| *G06F 9/455* | (2018.01) | |
| *H04L 9/40* | (2022.01) | |
| *H04L 67/53* | (2022.01) | |
| *H04L 67/63* | (2022.01) | |
| *G06F 21/53* | (2013.01) | |
| *H04L 41/50* | (2022.01) | |

(52) U.S. Cl.
CPC ............... *H04L 9/40* (2022.05); *H04L 41/50* (2013.01); *H04L 63/10* (2013.01); *H04L 67/02* (2013.01); *H04L 67/10* (2013.01); *H04L 67/34* (2013.01); *H04L 67/53* (2022.05); *H04L 67/63* (2022.05); *G06F 2009/45587* (2013.01)

(56) References Cited

U.S. PATENT DOCUMENTS

| | | | | |
|---|---|---|---|---|
| 9,235,804 | B1* | 1/2016 | Bieniasz-Krzywiec | ............... H04W 4/021 |
| 9,917,908 | B1* | 3/2018 | Knecht | ............... H04L 63/145 |
| 9,998,525 | B1* | 6/2018 | Lipus | ............... H04L 67/06 |
| 10,110,694 | B1* | 10/2018 | Watson | ............... H04L 67/568 |
| 10,498,812 | B1* | 12/2019 | Varda | ............... H04L 67/1095 |
| 2004/0194102 | A1* | 9/2004 | Neerdaels | ............... H04L 61/5007 718/100 |
| 2010/0058293 | A1* | 3/2010 | Dunagan | ............... G06Q 30/0277 717/116 |
| 2011/0154431 | A1* | 6/2011 | Walsh | ............... G06F 21/53 718/1 |
| 2011/0225647 | A1* | 9/2011 | Dilley | ............... H04L 63/16 726/14 |
| 2012/0054861 | A1* | 3/2012 | Pawlowsky | ............... G06F 8/51 726/22 |
| 2013/0080623 | A1* | 3/2013 | Thireault | ............... H04L 41/40 709/224 |
| 2013/0254343 | A1* | 9/2013 | Stevens | ............... H04L 67/06 709/219 |
| 2013/0275560 | A1* | 10/2013 | Bestmann | ............... H04L 41/0803 709/219 |
| 2014/0122698 | A1* | 5/2014 | Batrouni | ............... H04L 41/0896 709/224 |
| 2014/0245253 | A1* | 8/2014 | Goldfeder | ............... G06F 9/45529 717/100 |
| 2015/0143375 | A1* | 5/2015 | Bruso | ............... G06F 9/5077 718/101 |
| 2015/0180796 | A1* | 6/2015 | Chu | ............... H04L 47/70 709/226 |
| 2015/0229645 | A1* | 8/2015 | Keith | ............... H04L 41/50 726/4 |
| 2016/0028847 | A1* | 1/2016 | Bradshaw | ............... H04L 61/58 709/213 |
| 2017/0169123 | A1* | 6/2017 | Reshadi | ............... H04L 9/3236 |
| 2017/0255594 | A1* | 9/2017 | Hohnhold | ............... G06F 40/103 |
| 2017/0277909 | A1* | 9/2017 | Kraemer | ............... G06F 21/10 |
| 2018/0018149 | A1* | 1/2018 | Cook | ............... G06F 8/70 |
| 2018/0035321 | A1* | 2/2018 | Zhang | ............... H04W 24/08 |
| 2018/0103093 | A1* | 4/2018 | Zhao | ............... G06F 16/9535 |
| 2018/0150341 | A1* | 5/2018 | Pan | ............... G06F 9/5027 |
| 2018/0176193 | A1* | 6/2018 | Davis | ............... H04L 63/06 |
| 2018/0190003 | A1* | 7/2018 | Upadhyay | ............... G06T 15/005 |
| 2018/0227326 | A1* | 8/2018 | Shavro | ............... H04L 67/34 |
| 2018/0241884 | A1* | 8/2018 | Converse | ............... H04L 65/1059 |

\* cited by examiner

ISOLATED EXECUTION
ENVRIONMENT MODEL

VIRTUAL MACHINE
MODEL

CLOUD COMPUTING PLATFORM THAT EXECUTES THIRD-PARTY CODE IN A DISTRIBUTED CLOUD COMPUTING NETWORK

CROSS-REFERENCE TO RELATED APPLICATIONS

This application is a continuation of application Ser. No. 17/114,382, filed Dec. 7, 2020, now U.S. Pat. No. 11,561,805, which is a continuation of application Ser. No. 16/450,585, filed Jun. 24, 2019, now U.S. Pat. No. 10,860,340, which is a continuation of application Ser. No. 16/182,522, filed Nov. 6, 2018, now U.S. Pat. No. 10,331,462, which are hereby incorporated by reference.

FIELD

Embodiments of the invention relate to the field of network computing; and more specifically, to a cloud computing platform that executes third-party code in a distributed cloud computing network.

BACKGROUND

Historically, web application code has been split between origin servers and browsers that are connected by a network that transmits data from point to point. Many large websites were first run on large physical mainframe servers that could handle large traffic and large data. Over time a switch was made to run websites on tens to hundreds of commodity servers that allowed for a reduction in cost, more fault tolerance, and increased performance. The next switch was using virtual machines where one physical machine could be split into multiple virtual machines that can be independently managed. However, virtual machines typically have a high cost. For instance, each virtual machine is typically allocated hundreds of megabytes of RAM and typically takes tens of seconds to boot. Containers can be used to further provide isolation and are less resource intensive than virtual machines. But, web application code running in a container typically is run in its own OS-level process, consuming RAM and inducing context-switching overhead. Also, while native code can load quickly in a container, many server-oriented language environments are not optimized for startup time.

Some cloud computing platform process spin up a containerized process for your code and auto-scales the process which creates cold-starts. A cold-start occurs when a new copy of the code starts on a machine. A new containerized process is begun which can take between hundreds of milliseconds to multiple seconds (e.g., between 500 ms to 10 seconds). This means that any request may be hanging for as much time as it takes to begin the new containerized process (e.g., as much as ten seconds). Also, this containerized process can only process a single request at a time and a new containerized process must be cold-started each time an additional concurrent request is received. This means that a laggy request can happen over and over. Also, if the containerized process does not receive a request to process within a certain amount of time, it will automatically shut down and will need to be cold-started again once the request is received. When new code is deployed, this entire process proceeds again as each containerized process needs to be spun up anew.

One of the key features of an operating system is the ability to run many processes at once. The operating system transparently switches between the various processes that want to run code at any given time. The operating system accomplishes this through a context switch that moves the memory required for one process out and the memory required for the next process in. A context switch can take as much as 100 microseconds. When multiplied by all the processes running on the average cloud computing platform server creates a heavy overhead. This means that not all the CPU's power can be devoted to actually executing the customer code, but rather some is spent switching between the processes.

Most computing platforms are meant to be run by individual customers on their own servers. They are not intended to be run in a multi-tenant environment, executing code of other customers. Memory is often the highest cost of running a customer's code (even higher than the CPU cost).

Building and maintaining applications that easily scale to support spikes in demand or a global user base has generally required a large amount of both upfront engineering work and ongoing operational support. Developers are forced to spend significant time on writing supporting code rather than building the application itself. Many cloud computing platforms require the developer to specify where the code should run (e.g., at which nodes of the cloud computing platform), often with a small number of nodes that can be selected.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
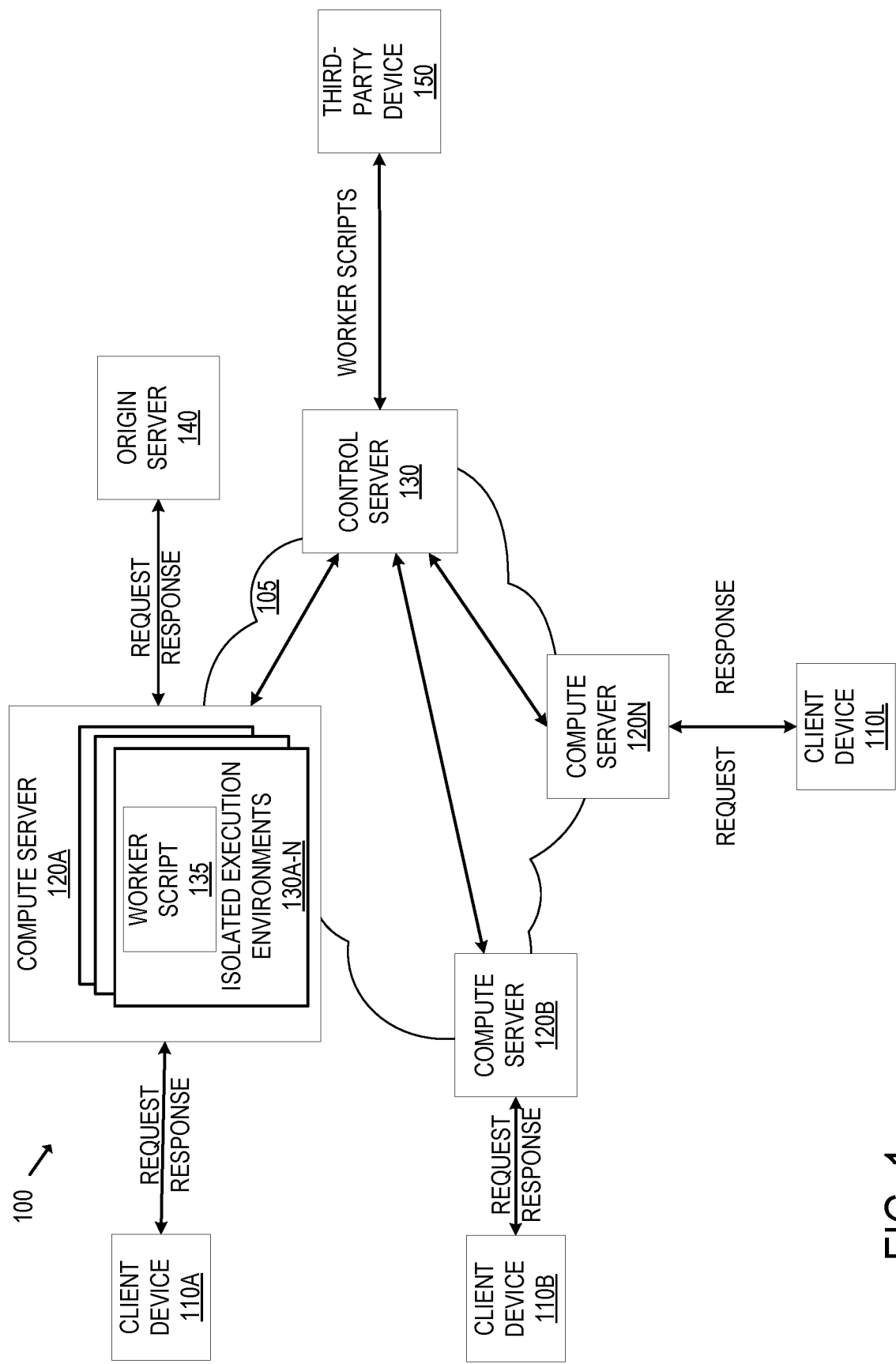
FIG. 1 illustrates an exemplary embodiment of a cloud computing platform that executes third-party code in a distributed cloud computing network according to an embodiment.

A method and apparatus for a cloud computing platform that executes third-party code in a distributed cloud computing network is described. The distributed cloud computing network includes multiple compute servers that are geographically distributed (e.g., in different locations throughout the world). There may be hundreds of compute servers that are geographically distributed in different points-of-presences (PoPs). Each PoP may include one or more physical servers (e.g., one or more compute servers, one or more control servers, one or more DNS servers (e.g., one or more authoritative name servers, one or more proxy DNS servers), and one or more other pieces of network equipment such as router(s), switch(es), and/or hub(s)). Each PoP may be part of a different data center and/or colocation site. The distributed cloud computing network may provide different services for customers (e.g., domain owners or operators) such as protecting against internet-based threats, performance services (e.g., acting as a content delivery network (CDN) and dynamically caching customer's files closer to visitors, page acceleration/optimization), TCP stack optimizations, and/or other services.

Third-party code (e.g., written by or deployed by third-parties such as customers) can be deployed to all or some of the compute servers of the distributed cloud computing network. The third-party code can be, for example, a piece of JavaScript or other dynamically-typed language, a WebAssembly (WASM) compiled piece of code, or other compiled code. In an embodiment, the third-party code is compliant with the W3C standard ServiceWorker API. The third-party code can, for example, intercept and answer HTTP requests and make outgoing HTTP subrequests as part of answering an HTTP request. For purposes of this description, each piece of third-party code is referred to as a worker script and an executed instance of the worker script is referred to as a worker.

A worker script of a particular third-party is run in an execution environment in which a single process can safely run third-party code. The process can contain multiple execution environments at the same time and the process can seamlessly switch between them. Code in one execution environment cannot interfere with code running in a different execution environment despite being in the same process. The execution environments are managed in user-space rather than by an operating system. Each execution environment uses its own mechanism to ensure safe memory access, such as preventing the code from requesting access to arbitrary memory (restricting its use to the objects it has been given) and/or interpreting pointers within a private address space that is a subset of an overall address space. This execution environment is not a container or virtual machine. For purposes of description, this type of execution environment is sometimes referred herein as an isolated execution environment. In a specific implementation, the worker script is run in an isolate of the V8 JavaScript engine.

Because a single process can run multiple isolated execution environments, the overhead of running the isolated execution environments is occurred once (e.g., starting the single process to run the isolated execution environments) and isolated execution environments can be started and run with very little individual overhead. The worker scripts are not executed using a virtual machine or a container. Unlike other cloud computing platforms that spin up a containerized process for processing code that can take as much as ten seconds, an isolated execution environment can be started in as little as 5 ms because a new process does not need to be started (assuming the single process that runs the isolated execution environments is started). Also, since the worker scripts can be run in a single process, there are no expensive context switches like experienced with other cloud computing platforms which means that more time is spent running the code instead of performing context switches. Also, because the implementations of the single process are shared between all isolated execution environments, the memory requirements are less than traditional cloud computing platforms.

In an embodiment, a particular worker script is loaded and executed on-demand (when and only if it is needed) at a particular compute server of the distributed cloud computing network. Each request for a domain that triggers handling of a worker script will be handed by the worker at the compute server that is closest to the requesting user. For instance, when responding to a user in New Zealand, a worker script is run in a compute server in New Zealand that is closest to the user. The compute server that receives the request may be determined by the network infrastructure according to an Anycast implementation or by a geographical load balancer.

FIG. 1 illustrates an exemplary embodiment of a cloud computing platform that executes third-party code in a distributed cloud computing network according to an embodiment. The cloud computing platform provides different services such as protecting against internet-based threats, providing performance services for customers (e.g., acting as a content delivery network (CDN) and dynamically caching customer's files close to visitors, page acceleration, etc.), TCP stack optimizations, and/or other services. The system 100 includes the client devices 110A-N, the compute servers 120A-N, the control server 130, the origin server 140, and the customer device 150.

Each client device is a computing device (e.g., laptop, workstation, smartphone, mobile phone, tablet, gaming system, set top box, wearable device, Internet of Things (IoT) device, etc.) that is capable of transmitting and/or receiving network traffic. Each client device may execute a client network application such as a web browser, native application, or other application that can access network resources (e.g., web pages, images, word processing documents, PDF files, movie files, music files, or other computer files).

The compute servers 120A-N are part of the cloud computing platform. The compute servers 120A-N are physical servers and are geographically distributed (e.g., in different locations throughout the world). The compute servers 120A-N are part of the distributed cloud computing network 105. There may be hundreds of compute servers as part of the cloud computing platform. Although not illustrated in FIG. 1, the compute servers 120A-N may be part of PoPs that may include other physical servers (e.g., one or more compute servers, one or more control servers, one or more DNS servers (e.g., one or more authoritative name servers, one or more proxy DNS servers), and one or more other pieces of network equipment such as router(s), switch(es), and/or hub(s)). Each PoP (and each compute server) may be part of a different data center and/or colocation site. Although not illustrated in FIG. 1, there are other physical devices between the compute servers 120A-N such as routers, switches, etc.

The control server 130 is operated by the cloud computing platform and provides a set of tools and interfaces for a customer to, among other things, configure code to run in the cloud computing platform. For instance, the control server 130 may allow the customer to upload one or more worker scripts and may allow the customer to specify when the worker script(s) are to be run. For instance, the customer may associate a rule that indicates when a worker script is to be run. By way of example, the control server 130 may allow the customer to configure a URL matching pattern that indicates the URL(s) for which the worker script is to run. The control server 130 may allow the customer to delete and update previously uploaded worker script(s).

The control server 130 deploys each worker script to each of the compute servers 120A-N automatically (without the customer selecting which of the compute servers 120A-N in which to deploy the worker script). In another embodiment, the control server 130 allows the customer to indicate which of the compute servers 120A-N are to be deployed a particular worker script. The control server 130 creates an identifier for each unique worker script. In an embodiment, the identifier is created by hashing the content of the worker script (e.g., using a cryptographic hash function such as SHA-256), where two scripts with identical content will have the same identifier even if uploaded by different customers and even if applied to different zones.

In an embodiment, the control server 130 allows a customer to provision the service to the cloud computing platform through DNS. For example, DNS record(s) of a customer are changed such that DNS records of hostnames point to an IP address of a compute server instead of the origin server. In some embodiments, the authoritative name server of the customer's domain is changed to an authoritative name server of the service and/or individual DNS records are changed to point to the compute server (or point to other domain(s) that point to a compute server of the service). For example, the customers may change their DNS records to point to a CNAME record that points to a compute server of the service. In one embodiment, customers may use the control server 130 to change their authoritative name server to an authoritative name server of the cloud computing platform and/or change their zone file records to have their domain point to the compute servers.

The third-party device 150 is a computing device (e.g., laptop, workstation, smartphone, mobile phone, tablet, etc.) that is used by third-parties to, among other things, configure their third-party code to run in the cloud computing platform. A third-party may be a customer of the cloud computing platform and/or a party that is configuring third-party code to run in the cloud computing platform.

The origin server 140, which may be owned or operated directly or indirectly by the customer of the cloud computing platform, is a computing device on which a network resource resides and/or originates (e.g., web pages, images, word processing documents, PDF files movie files, music files, or other computer files). In an embodiment, the origin server 140 is not required to be in the cloud computing platform (e.g., third-party code may run on the compute servers without communicating with an origin server). Although FIG. 1 illustrates the origin server 140 communicating with the compute server 120A, the origin server 140 may also communicate with one or more of the other compute servers 120B-N.

The compute servers 120A-N are geographically distributed which decreases the distance between requesting client devices and the compute servers and decreases the time necessary to respond to a request. The compute servers 120A-N may operate as a reverse proxy and receive request for network resources (e.g., HTTP requests) of a domain of the origin server 140. The particular compute server 120 that receives a request from a client device may be determined by the network infrastructure according to an Anycast implementation or by a geographical load balancer. For instance, the compute servers 120A-N may have a same anycast IP address for a domain of the origin server 140. If the origin server 140 handles the domain "example.com", a DNS request for "example.com" returns an address record having the anycast IP address of the compute servers 120A-N. Which one of the compute servers 120A-N receives a request from a client device depends on which compute server 120 is closest to the client device in terms of routing protocol configuration (e.g., Border Gateway Protocol (BGP) configuration) according to an anycast implementation as determined by the network infrastructure (e.g., router(s), switch(es), and/or other network equipment between the requesting client and the compute servers 120A-N. By way of example, the client device 110A is closest to the compute server 120A, the client device 110B is closest to the compute server 120B, and the client device 110L is closest to the compute server 120N. Accordingly, requests from the client device 110A are received at the compute server 120A, requests from the client device 110B are received at the compute server 120B, and requests from the client device 110L are received at the compute server 120N. In some embodiments, instead of using an anycast mechanism, a geographical load balancer is used to route traffic to the nearest compute server. The number of client devices and compute servers illustrated in FIG. 1 is exemplary. The distributed cloud computing network 105 may include hundreds to thousands (or more) compute servers and each compute server may receive requests from thousands or more client devices.

In the example of FIG. 1, each of the compute servers 120A-N can execute the worker script(s) of a third-party. Each worker script is run in an isolated execution environment, such as run in an isolate of the V8 JavaScript engine. Thus, as illustrated in FIG. 1, the compute server 120A includes the isolated execution environments 130A-N that each executes a separate worker script 135. The isolated execution environment 130A-N are run within a single process. The worker scripts are not executed using a virtual machine or a container. In an embodiment, a particular worker script is loaded and executed on-demand (when and only if it is needed) at a particular compute server of the distributed cloud computing network. Each request for a domain that triggers handling of a worker script will be handed by the worker at the compute server that is closest to the requesting user.

Figure 2:
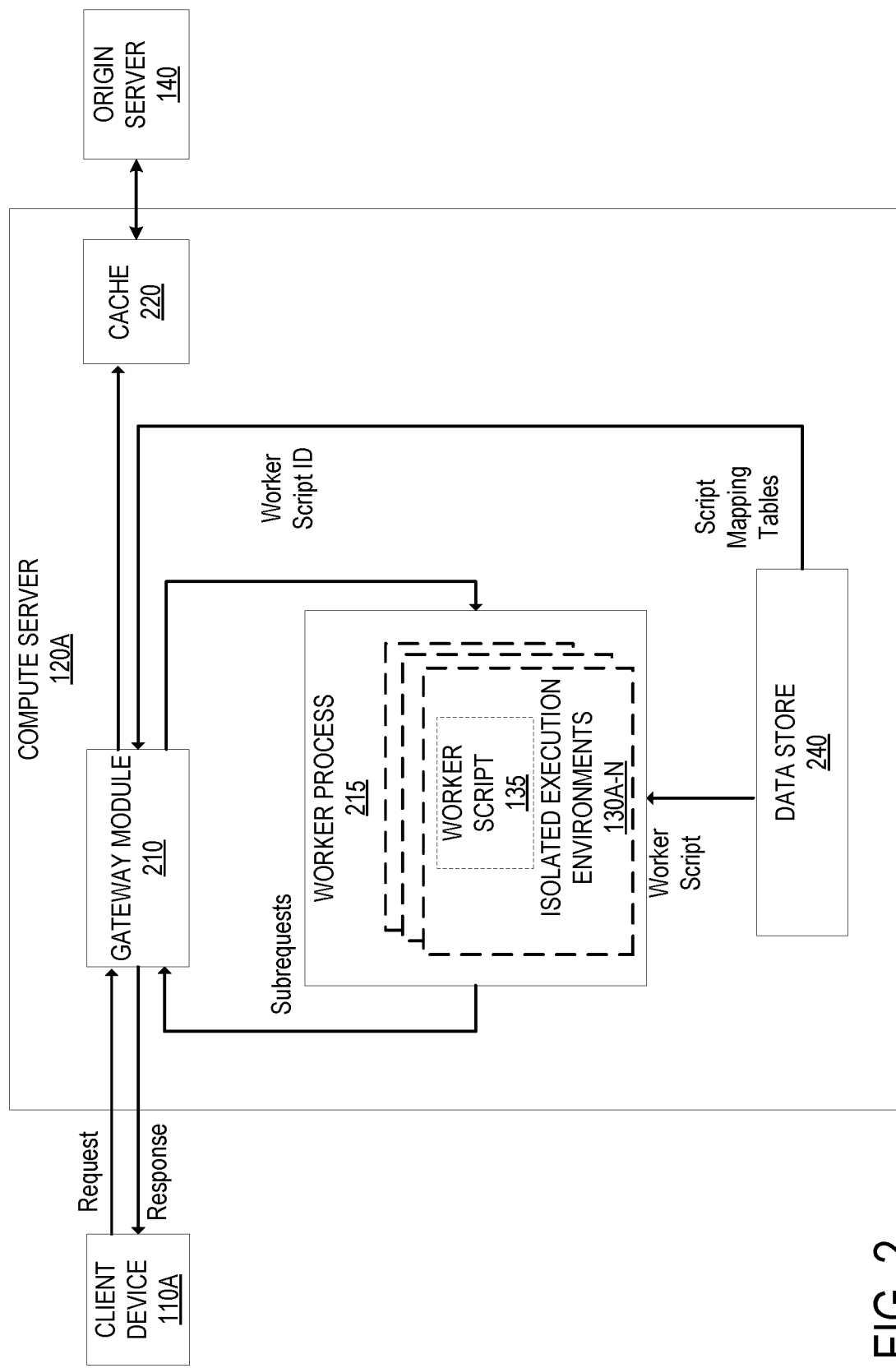
FIG. 2 illustrates an example of a compute server according to an embodiment.

FIG. 2 illustrates an example of a compute server 120 according to an embodiment. The compute server 120A includes a gateway module 210, a worker process 215, a cache 220, and a data store 240. The gateway module 210 receives web requests and processes web responses (e.g., HTTP requests and HTTP responses). The gateway module 210 may be acting as a reverse proxy for the origin server 140. The gateway module 210 has access to the cache 220 that is configured to cache network resources (e.g., web pages, images, word processing documents, PDF files movie files, music files, or other computer files), configuration files, scripts, and/or other computer files. The data store 240 is configured to store, among other items, the worker scripts that are received from the control server 130, the URL matching pattern rule that indicates the URL(s) for which the worker script is to run, and a worker script mapping that maps worker script identifiers to URL matching patterns.

The worker process 215 is a single process that executes the isolated execution environments 130A-N. There may be hundreds to thousands of isolated execution environments that are run simultaneously by the worker process 215. Each different worker script 135 is run by a different one of the isolated execution environments 130A-N each with its own heap. The worker process 215 starts an isolated execution environment to load a particular worker script on the first use of the worker script. Depending on the complexity of the worker script, loading the worker script may take approximately tens to hundreds of milliseconds of CPU time. A worker script says loaded in memory between requests so that the worker script can be used to respond quickly when a new request that triggers that worker script arrives. Handling a single request for a worker script that is already loaded typically takes a fraction of a millisecond of CPU time depending on the complexity of the worker script. In an embodiment, one isolated execution environment is created per unique worker script identifier. Thus, if many zones use identical worker scripts, memory is saved by compiling the script only once. The worker process 215 evicts worker scripts (e.g., in a least recently used fashion). The worker process 215 may be started during booting of the compute server 120A or when the first worker script is triggered for execution.

The gateway module 210 receives a request from the client device 110A. The request may be an HTTP request for a zone of the customer. The gateway module 210 processes the request including determining whether the request triggers executing of a worker script. For instance, the gateway module 210 analyzes the request URL against the URL matching pattern configured for the zone to determine if a worker script is to be executed. If a worker script is to be executed, the gateway module 210 annotates the request with the identifier of the worker script to be executed as determined by the script mapping table and forwards the request to the worker process 215. If the identified worker script is already loaded (if there is already an isolated execution environment running an instance of the worker script), the worker process 215 does not need to load another instance of the worker script. However, if the identified worker script that is already loaded is from a different zone (which is probably from a different customer), the worker process 215 creates a separate context (a global object) for the worker script so that each zone has its own isolated global state. That prevents zones from interfering with the state of other zones. The gateway module 210 generates the response after the worker script(s) are executed. If the identified worker script is not loaded, the worker process 215 creates an isolated execution environment and loads and executes the worker script.

The executed worker script can take various actions depending on how the script is written. The worker script may make one or more further requests (referred herein as "subrequests") such as additional HTTP requests. These subrequests may be destined for the origin server 140 or to other destinations on the internet. The worker process 215 sends the subrequests back to the gateway module 210 for further processing. The gateway module 210 is configured to prevent the subrequest from looping back to the same worker script. But, the subrequest may trigger a different worker script potentially from a different zone. If the subrequest is to the same zone, the gateway module 210 transmits the subrequest to the origin server 140 for processing and receives the response from the origin server 140. If the subrequest triggers a worker script, the gateway module 210 annotates the request with the identifier of the worker script to be executed as determined by the script mapping table and forwards the request to the worker process 215 for executing the script.

Thus, a single request can trigger multiple worker scripts, even from different zones from different customers, to be run. Since the worker scripts are run on the same physical compute server, network latency to execute these scripts reduces to zero. Further, there is savings in bandwidth because the different origin zones may not need to be contacted. To provide an example, say a customer has a service where a user can make a purchase by an SMS message. The user sends an SMS message to make the purchase where the SMS message is handled by an API of a first third-party provider that generates an event to a function. That function invokes a payment API of a second third-party provider to charge the user's credit card, which generates an invoice event that is handled by a function to email the invoice to the user. Each of these transactions involve potentially crossing the internet, incurring latency and bandwidth charges. In contrast, with embodiments described herein, the API of the first third-party provider and the API of the second third-party provider can be implemented as worker scripts and executed on the same physical compute server, reducing latency and bandwidth.

The worker scripts can perform many different actions. By way of example, the worker scripts may perform one or more of the following: intercept and modify HTTP request and response URLs, status, headers, and body content; respond to requests directly from the worker script or forward the request elsewhere; send HTTP requests to third-party servers; send multiple requests, in serial or in parallel, and use the responses to compose a final response to the original request; send asynchronous requests after the response has already been returned to the client (for example, for logging or analytics); and control behavior such as caching behavior. A customer may perform one or more of these actions to do the following, for example: perform A/B testing between two different back-ends; build "serverless" applications that rely entirely on web APIs; create custom security filters to block unwanted traffic; rewrite requests to improve cache hit rate; implement custom load balancing and failover logic; and/or collecting analytics without running code in the user's browser. Of course, these are just examples and the worker scripts can be used to perform other actions.

Figure 3:
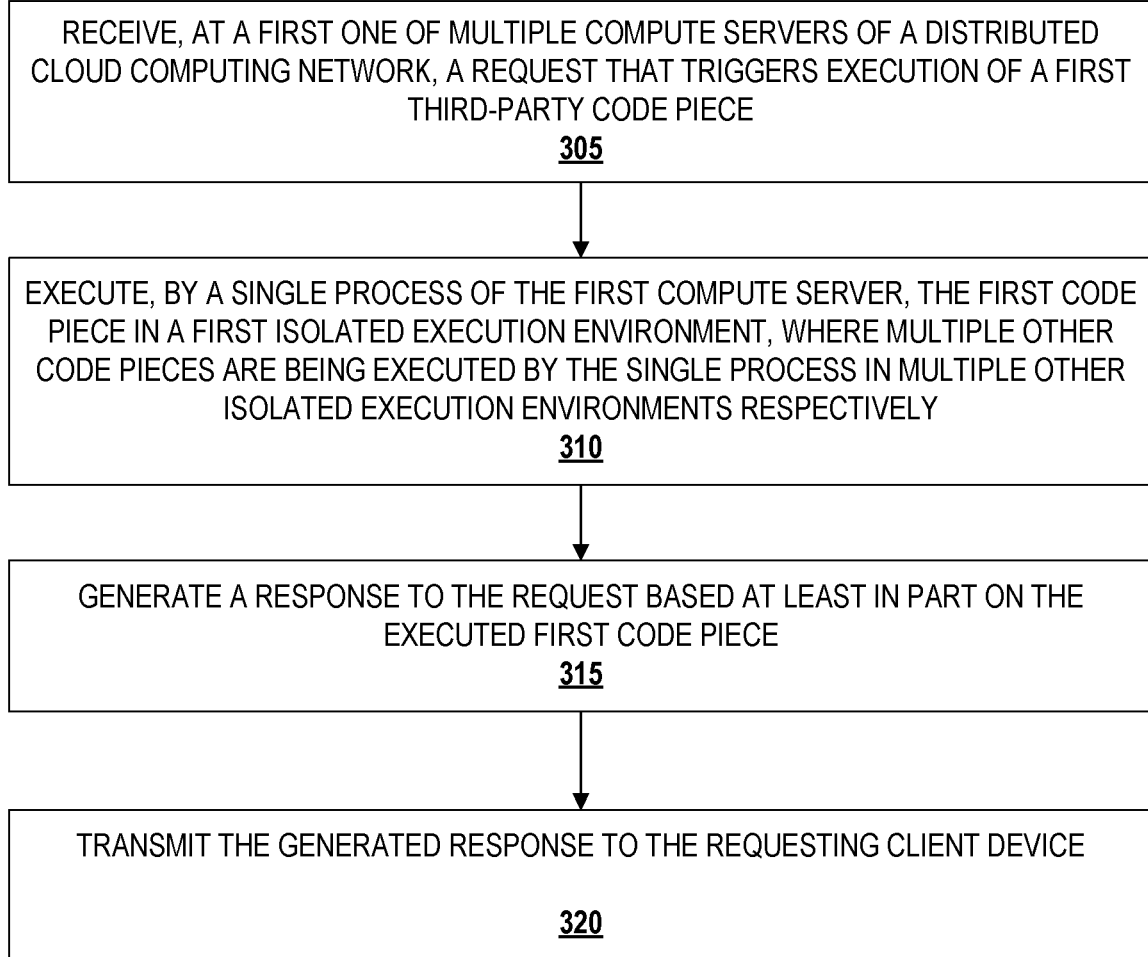
FIG. 3 is a flow diagram that illustrates exemplary operations for executing third-party code in a distributed cloud computing network according to an embodiment.

FIG. 3 is a flow diagram that illustrates exemplary operations for executing third-party code in a distributed cloud computing network according to an embodiment. The operations of FIG. 3 are described with respect to the exemplary embodiment of FIG. 1. However, the operations of FIG. 3 can be performed by different embodiments than those of FIG. 1, and the embodiment described in FIG. 1 can perform operations different than those of FIG. 3. The operations of FIG. 3 will be described with respect to HTTP/S request and responses. But, the operations of FIG. 3 can be performed with different types of requests and responses.

At operation 305, a first one of multiple compute servers of a distributed cloud computing network receives a request that triggers execution of a first code piece. The request may be received by a client device and be an HTTP or HTTPS request, for example, destined for a zone. The first code piece is one of multiple code pieces that can be executed by the first compute server. The first code piece may be a third-party code piece (written and/or provided by an owner or operator of the zone). The first code piece can be, for example, a piece of JavaScript or other dynamically-typed language, a WASM compiled piece of code, or other compiled code. The first compute server may determine that the request triggers execution of the first code piece by matching the zone to a predetermined matching pattern that associates the first code piece to the predetermined matching pattern. For instance, the compute server may analyze the request URL against a URL matching pattern configured for the zone to determine if a code piece is to be executed and if so, which code piece. With respect to FIG. 1, the compute server 120A receives a request from the client device 120A that triggers execution of a first code piece. To provide an example, the HTTP request is an HTTP GET method for "example.com", which matches a predefined matching pattern to apply to a code piece with a first identifier.

The distributed cloud computing network includes multiple compute servers including the first compute server. The compute servers are geographically distributed. There may be hundreds or more compute servers. In an embodiment, each of the compute servers are anycasted to a same IP address, and the first compute server receives the request in operation 305 because the first compute server is the closest one of the compute servers to the client device making the request as determined by an anycast implementation. For instance, a DNS request for an address record of the zone "example.com" returns an anycasted IP address of the compute servers. Alternatively, the first compute server may receive the request as a result of a geographical load balancer routing the request to it.

In an embodiment, each of the compute servers of the distributed cloud computing network includes the first code piece. The first code piece can be deployed to each of the compute servers without the owner or operator of the zone selecting which of the compute servers are to receive and potentially run the first code piece. In an alternative embodiment, the owner or operator of the zone selects which of the compute servers are to receive and potentially run the first piece.

Next, at operation 310, a single process of the first compute server executes the first code piece in a first isolated execution environment. Multiple other code pieces are being executed by the single process in multiple other isolated execution environments respectively. Code in one isolated execution environment cannot interfere with code running in a different execution environment despite being in the same process. The code pieces may be triggered to execute for different zones and different customers. The isolated execution environment is managed in user-space rather than by an operating system. Data cannot be shared or moved across isolated execution environments (each isolated execution environment has a completely separate state). The single process on the compute server can run multiple isolated execution environments (e.g., hundreds to thousands) seamlessly switching between them. Each isolated execution environment uses its own mechanism to ensure safe memory access, such as preventing the code from requesting access to arbitrary memory (restricting its use to the objects it has been given) and/or interpreting pointers within a private address space that is a subset of an overall address space. In a specific implementation, the first code piece is run in an isolate of the V8 JavaScript engine.

In an embodiment, the first code piece is loaded and executed on-demand (when and only if it is triggered to execute). That is, first code piece will not be loaded into memory until and unless a request triggers it for execution. The first code piece stays loaded in memory (at least for a certain amount of time) between requests so that the first code piece can be used to respond quickly if a new request is received that triggers execution of that same first code piece. An eviction process may evict code pieces in a least recently used fashion. If the first code piece is not already loaded in memory and/or an isolated execution environment is not running for to execute the first code piece, an isolated execution environment is created, and/or the first code piece is loaded to memory. Depending on the complexity of the first code piece, loading the first code piece may take approximately tens to hundreds of milliseconds of CPU time.

Executing the first code piece can take many actions depending on the instructions of the first code piece, including actions to improve performance, enhance security, and/or increase reliability. As an example for improving performance, the first code piece can perform the following: use custom logic to decide which if the request is cacheable at the compute server, and canonicalize the requests to improve cache hit rate; expand HTML templates directly on the compute server, fetching only dynamic content from the origin server; respond to stateless requests directly from the compute server without contacting the origin server; and/or split one request into multiple parallel requests to different servers, then combine the responses into a single response to the client. As examples for enhancing security, the first code piece can perform the following: implement custom security rules and filter; and/or implement custom authentication and authorization mechanism. As examples for increasing reliability, the first code piece can perform the following: deploy fast fixes to the website without having to update the code on the origin server; implement custom load balancing and failover logic; and respond dynamically when the origin server is unreachable.

The execution of the first code piece may cause a subrequest to be generated. A subrequest is an additional request such as an additional HTTP request. The subrequest can be destined for the origin server of the zone or can be destined to a different server on the Internet. If the subrequest is for the zone, the first compute server is configured to prevent the subrequest from looping back to the same first piece of code. Instead, the first compute server transmits the subrequest to the origin server for processing.

If the subrequest is for a different zone that handled by the first compute server (e.g., a DNS request for an address record of the different zone returns an anycasted IP address of the compute servers), the subrequest can be processed by the first compute server directly (without the subrequest being transmitted to another compute server, for example). Processing of this subrequest may trigger a different code piece to be executed. If the subrequest is for a different zone that is not handled by the first compute server (e.g., a DNS request for an address record of the different zone does not return an IP address of the first compute server), the compute server transmits the subrequest to that different server. In an embodiment, a code piece is limited to a predefined number of subrequests. A header stores a number that counts the number of subrequests and if it exceeds the limit, the subrequest will not be processed.

Next, at operation 315, the first compute server generates a response to the request based at least in part on the executed first code piece. The response may be an HTTP response, for example. The content of the response depends on the execution of the first code piece. In an embodiment, the execution of the first code piece itself returns an HTTP response. The first code piece can be written to respond to the request directly (with no subrequests). Alternatively, the first code piece can be written to make one or more subrequests and generate the response with the results of the subrequest(s). Next, at operation 320, the first compute server transmits the generated response to the requesting client device.

Figure 4:
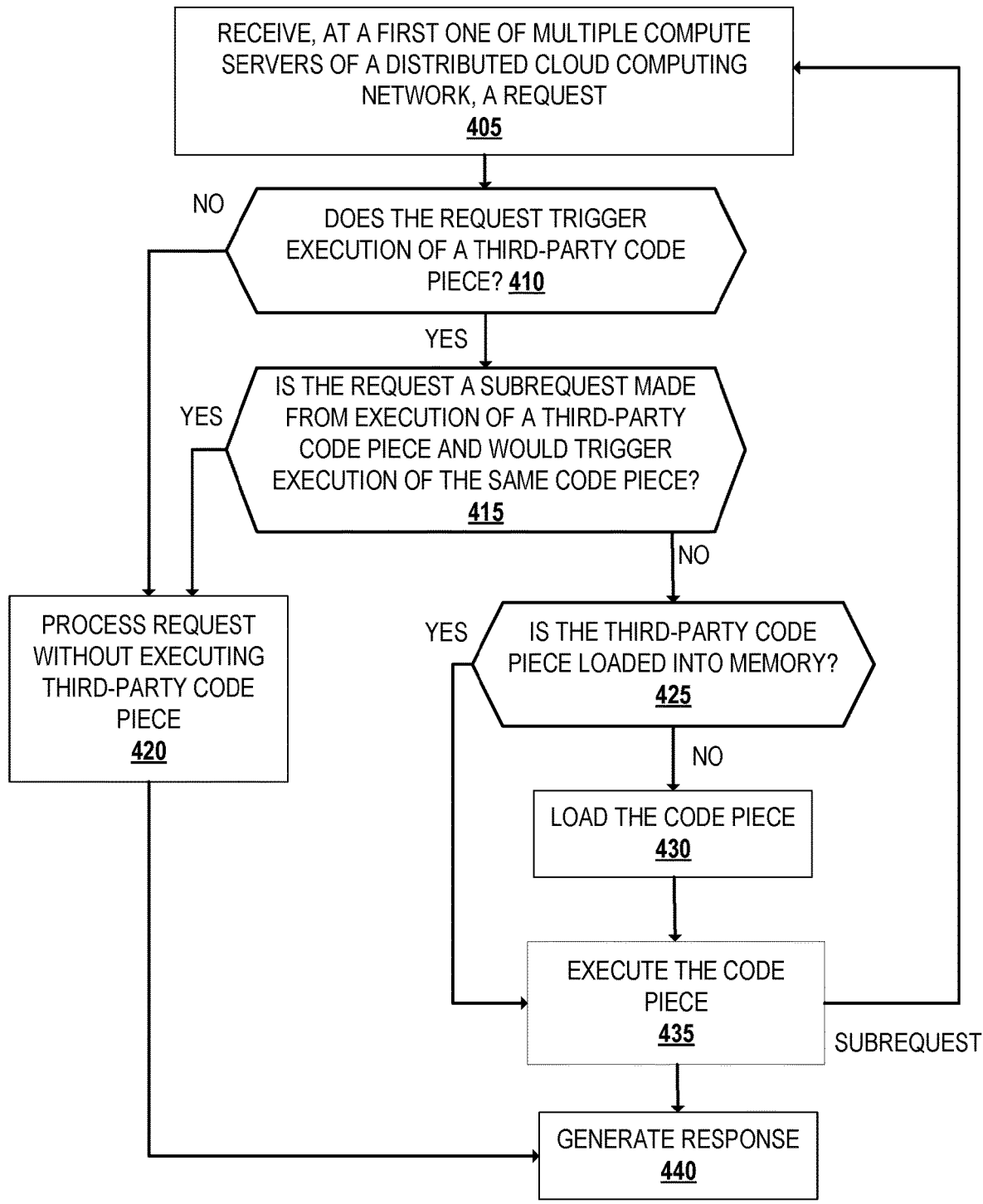
FIG. 4 is a flow diagram that illustrates exemplary operations for executing third-party code in a distributed cloud computing network according to an embodiment.

FIG. 4 is a flow diagram that illustrates exemplary operations for executing third-party code in a distributed cloud computing network according to an embodiment. The operations of FIG. 4 are described with respect to the exemplary embodiment of FIGS. 1 and 2. However, the operations of FIG. 4 can be performed by different embodiments than those of FIGS. 1 and 2, and the embodiment described in FIGS. 1 and 2 can perform operations different than those of FIG. 4. The operations of FIG. 4 will be described with respect to HTTP/S request and responses. But, the operations of FIG. 4 can be performed with different types of requests and responses.

At operation 405, a first one of multiple compute servers of a distributed cloud computing network receives a request. The request may be received by a client device and be an HTTP or HTTPS request, for example, destined for a zone.

In an embodiment, the compute server receives the request out of the multiple compute servers because it has been determined to be the closest to the requesting client device as determined by an anycast implementation. Instead of the request being received from an external client device, the request could be received as a subrequest sent by a third-party code piece. If a subrequest, the subrequest may identify the third-party code piece that generated the subrequest (e.g., it may include the identifier of the third-party code piece).

With respect to FIG. 2, the gateway module 210 receives the request. Next at operation 310, the gateway module 210 determines whether the request triggers execution of a third-party code piece. The gateway module 210 may determine that the request triggers execution of a third-party code piece by matching the zone to a predetermined matching pattern that associates the third-party code piece to the predetermined matching pattern. For instance, the gateway module 210 may analyze the request URL against a URL matching pattern configured for the zone to determine if a third-party code piece is to be executed and if so, which third-party code piece. If the request does not trigger execution of a third-party code piece, then operations move to operation 420. If the request triggers execution of a third-party code piece, then operations move to operation 415.

The gateway module 210 is configured to prevent a subrequest from looping back to the same third-party code piece. Thus, at operation 415, the gateway module 210 determines if the request is from a subrequest made from execution of a third-party code piece and would trigger execution of the same third-party code piece. For example, the gateway module 210 determines whether the request identifies the third-party code piece as generating the request and determines whether the request triggers execution of the same third-party code piece using the predetermined matching pattern. If the request is a subrequest and would trigger execution of the same third-party code piece, then flow moves to operation 420. Otherwise, flow moves to operation 425.

At operation 420, the request is processed without executing a third-party code piece. The request may be processed differently depending on the destination of the request and the requester. For instance, if the request is for a web page from a client device, the gateway module 210 may access the web page and/or the resource(s) of the web page from the cache 220 (if available) and/or from the origin server of the domain of the web page. If the request is from a third-party code piece (a subrequest), the gateway module 210 processes the request and response and returns the data to the third-party code piece for further processing. After processing the request, flow moves to operation 440 for generating the response.

In an embodiment, third-party code pieces stay loaded in memory between requests so that they can be used to respond quickly when a new request that triggers the third-party code piece arrives. A third-party code piece may be run separately per zone. Each different zone running the same third-party code piece may be put in a separate context (have their own global object) within the same isolated execution environment running that third-party code piece so each zone as its own isolated global state. This prevents two different zones from interfering with the states of each other while allowing the contexts to share resources. At operation 425, the gateway module 210 determines whether the third-party code piece is loaded into memory. If the third-party code piece is loaded (e.g., if there is already an isolated execution environment running for the third-party code piece for the zone), the third-party code piece is executed in operation 435. If the third-party code piece is not loaded, then at operation 430 the third-party code piece is loaded and then the third-party code piece is executed in operation 435.

The executed third-party code piece can take various actions depending on how the code is written. The third-party code piece may make one or more subrequests that can be destined for an origin server of the zone of the third-party code piece or to other destinations on the internet. As illustrated in FIG. 4, if executing the code piece 435 causes a subrequest to be generated, the subrequest is received at the gateway module 210 in operation 405. The subrequest identifies the third-party code piece that generated the subrequest. The result of the subrequest may be processed by the code piece.

At operation 440, a response is generated. The response may be an HTTP response, for example. If a third-party code piece was executed, the content of the response depends on the execution of that third-party code piece. The response is sent to the requesting client.

Figure 5:
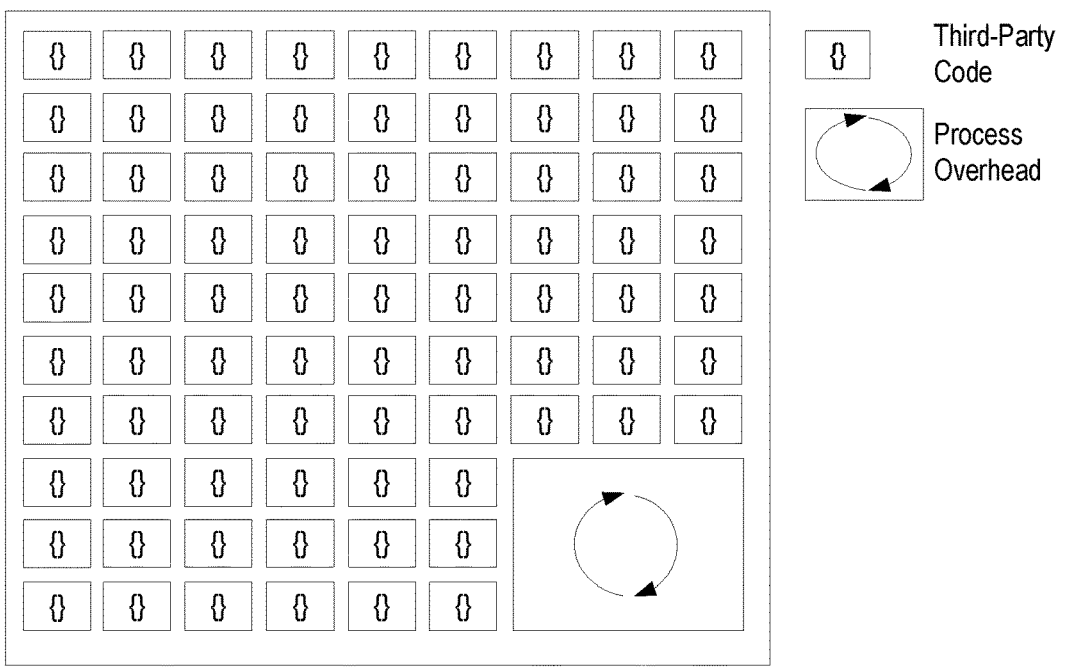
FIG. 5 is a conceptual figure that shows a conceptual relationship between third-party code and the process overhead of the isolated execution environment model that is described in embodiments.
Figure 6:
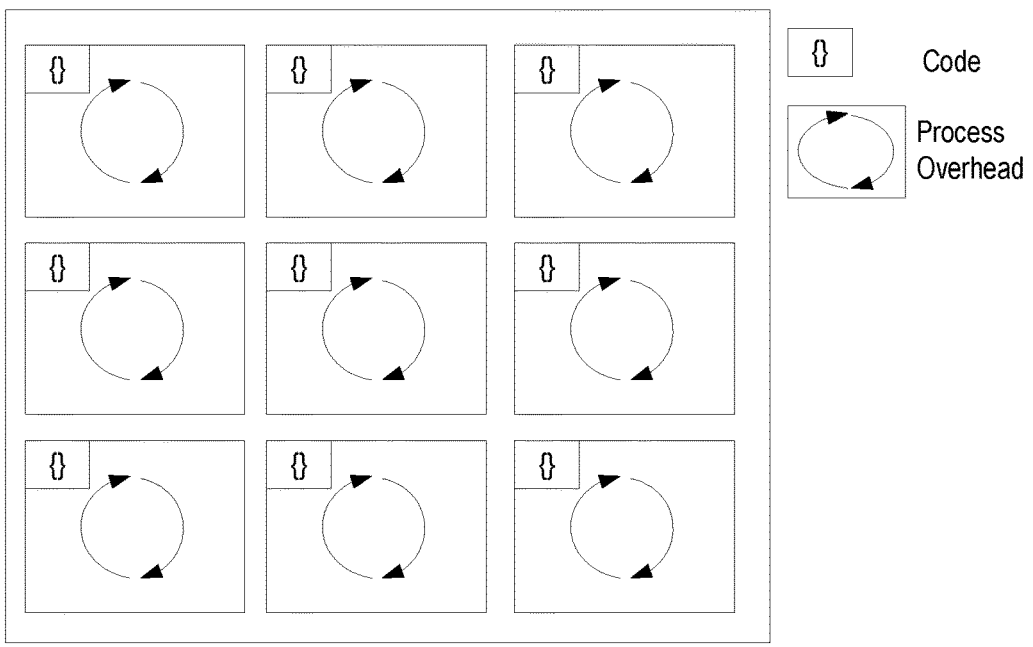
FIG. 6 is a conceptual figure that shows a conceptual relationship between code and the process overhead of a virtual machine model.

Running third-party code pieces in isolated execution environments improves the performance as compared with running code using a virtual machine or a container. Unlike other computing platforms that spin up a containerized process for processing code that can take as much as ten seconds, an isolated execution environment can be started in as little as 5 ms because a new process does not need to be started. Thus, the overhead of running an isolated execution environment is small as compared to other computing platforms. Further, since the third-party code can be run in a single process, there are no expensive context switches like experienced with other computing platforms which means that more time is spent actually running the code instead of performing context switches. FIG. 5 is a conceptual figure that shows a conceptual relationship between third-party code and the process overhead of the isolated execution environment model that is described in embodiments herein. FIG. 6 is a conceptual figure that shows a conceptual relationship between code and the process overhead of a virtual machine model. As seen in FIGS. 5 and 6, the process overhead of the virtual machine model is experienced for each different code piece (a new process has to be started for each different code piece), whereas the process overhead of the isolated execution environment model is experienced once.

Figure 7:
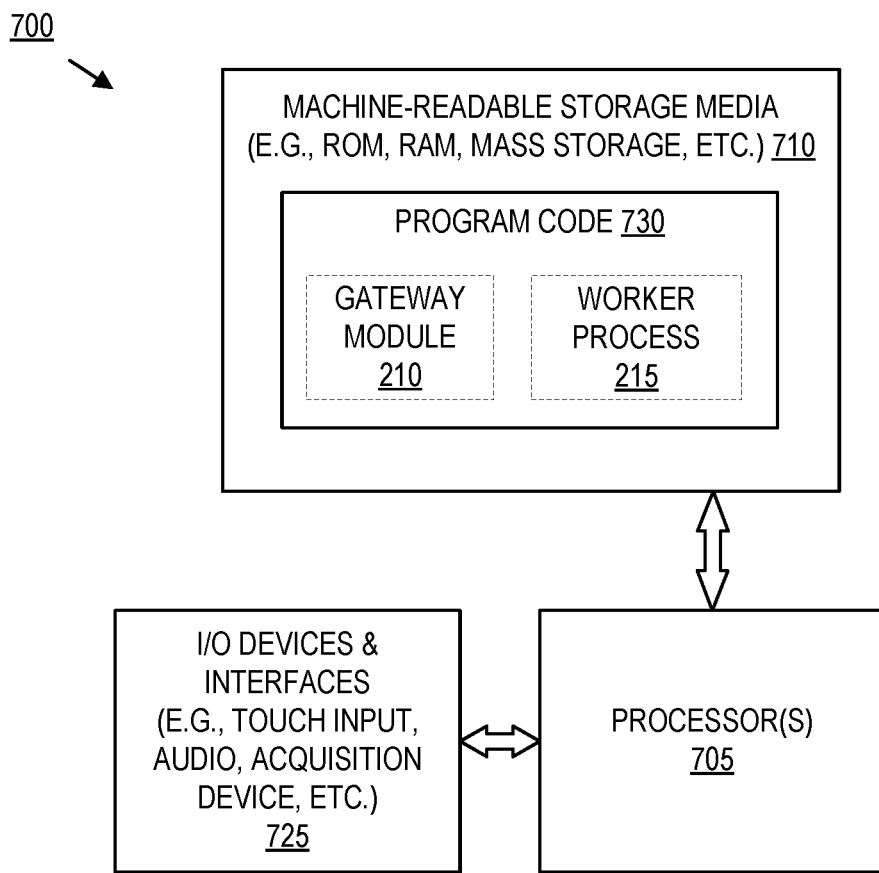
FIG. 7 illustrates a block diagram for an exemplary data processing system that may be used in some embodiments.

FIG. 7 illustrates a block diagram for an exemplary data processing system 700 that may be used in some embodiments. Data processing system 700 includes one or more processors 705 and connected system components (e.g., multiple connected chips). One or more such data processing systems 700 may be utilized to implement the embodiments and operations described with respect to the compute server, control server, or other electronic device.

The data processing system 700 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 710 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 705. For example, the depicted machine-readable storage media 710 may store program code 730 that, when executed by the processor(s) 705, causes the data processing system 700 to execute the gateway module 210 and/or the worker process 215.

The data processing system 700 also includes one or more input or output ("I/O") devices and interfaces 725, which are provided to allow a user to provide input to, receive output from, and otherwise transfer data to and from the system. These I/O devices 725 may include a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. The I/O devices and interfaces 725 may include wireless transceivers, such as an IEEE 802.11 transceiver, an infrared transceiver, a Bluetooth transceiver, a wireless cellular telephony transceiver (e.g., 2G, 3G, 4G, 5G), an NFC transceiver, or another wireless protocol to connect the data processing system 700 with another device, external component, or a network and receive stored instructions, data, tokens, etc. For instance, a wired or wireless transceiver may transmit and receive messages to and from the compute server as described herein.

Additional components, not shown, may also be part of the system 700, and, in certain embodiments, fewer components than that shown in FIG. 7 may also be used in a data processing system 700. One or more buses may be used to interconnect the various components shown in FIG. 7.

Thus, an electronic device (e.g., a computer or a mobile client device) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The techniques shown in the figures can be implemented using code and data stored and executed on one or more computing devices (e.g., client device, compute server, DNS server, control server, origin server, etc.). Such computing devices store and communicate (internally and/or with other computing devices over a network) code and data using machine-readable media, such as non-transitory machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
receiving, at a compute server from a client device, a first request that triggers execution of a first one of a plurality of third-party code pieces, and wherein the first request is directed to a first zone;
executing, by a single process at the compute server, the first one of the plurality of third-party code piece;
generating, as a result of the executing the first one of the plurality of third-party code pieces, a second request that triggers execution of a second one of the plurality of third-party code pieces, wherein the second request is directed to a second zone;
executing, by the single process, the second one of the plurality of third-party code pieces;
generating a response to the first request based at least in part on the executed first one of the plurality of third-party code pieces and the executed second one of the plurality of third-party code pieces; and
transmitting the generated response to the client device.

2. The method of claim 1, wherein executing the first one of the plurality of third-party code pieces further causes a third request to be generated and transmitted to an origin server of the first zone.

3. The method of claim 1, wherein generating the response is performed without transmitting a request to an origin server of the first zone.

4. The method of claim 1, further comprising:
determining the first request triggers execution of the first one of the plurality of third-party code pieces by matching the first zone to a predetermined matching pattern that associates the first one of the plurality of third-party code pieces to the predetermined matching pattern.

5. The method of claim 1, wherein the compute server is one of a plurality of compute servers that are each anycasted to a same IP address, and wherein the compute server receives the first request because it is a closest one of the plurality of compute servers to the client device as determined by an anycast implementation.

6. The method of claim 5, wherein each of the plurality of compute servers include the plurality of third-party code pieces.

7. The method of claim 1, wherein the first one of the plurality of third-party code pieces is provided by an owner or operator of the first zone.

8. A non-transitory machine-readable storage medium that provides instructions that, when executed by a processor, cause the processor to perform operations comprising:
receiving, at a compute server from a client device, a first request that triggers execution of a first one of a plurality of third-party code pieces, and wherein the first request is directed to a first zone;
executing, by a single process at the compute server, the first one of the plurality of third-party code piece;
generating, as a result of the executing the first one of the plurality of third-party code pieces, a second request that triggers execution of a second one of the plurality of third-party code pieces, wherein the second request is directed to a second zone;
executing, by the single process, the second one of the plurality of third-party code pieces;
generating a response to the first request based at least in part on the executed first one of the plurality of third-party code pieces and the executed second one of the plurality of third-party code pieces; and
transmitting the generated response to the client device.

9. The non-transitory machine-readable storage medium of claim 8, wherein executing the first one of the plurality of third-party code pieces further causes a third request to be generated and transmitted to an origin server of the first zone.

10. The non-transitory machine-readable storage medium of claim 8, wherein generating the response is performed without transmitting a request to an origin server of the first zone.

11. The non-transitory machine-readable storage medium of claim 8, wherein the operations further comprise:
determining the first request triggers execution of the first one of the plurality of third-party code pieces by matching the first zone to a predetermined matching pattern that associates the first one of the plurality of third-party code pieces to the predetermined matching pattern.

12. The non-transitory machine-readable storage medium of claim 8, wherein the compute server is one of a plurality of compute servers that are each anycasted to a same IP address, and wherein the compute server receives the first request because it is a closest one of the plurality of compute servers to the client device as determined by an anycast implementation.

13. The non-transitory machine-readable storage medium of claim 12, wherein each of the plurality of compute servers include the plurality of third-party code pieces.

14. The non-transitory machine-readable storage medium of claim 8, wherein the first one of the plurality of third-party code pieces is provided by an owner or operator of the first zone.

15. A compute server, comprising:
a set of one or more processors; and
a non-transitory machine-readable storage medium that provides instructions that, when executed by the set of processors, cause the set of compute server to perform the following operations:
receiving, at the compute server from a client device, a first request that triggers execution of a first one of a plurality of third-party code pieces, and wherein the first request is directed to a first zone;
executing, by a single process at the compute server, the first one of the plurality of third-party code piece;
generating, as a result of the executing the first one of the plurality of third-party code pieces, a second request that triggers execution of a second one of the plurality of third-party code pieces, wherein the second request is directed to a second zone;
executing, by the single process, the second one of the plurality of third-party code pieces;
generating a response to the first request based at least in part on the executed first one of the plurality of third-party code pieces and the executed second one of the plurality of third-party code pieces; and
transmitting the generated response to the client device.

16. The compute server of claim 15, wherein executing the first one of the plurality of third-party code pieces further causes a third request to be generated and transmitted to an origin server of the first zone.

17. The compute server of claim 15, wherein generating the response is performed without transmitting a request to an origin server of the first zone.

18. The compute server of claim 15, wherein the operations further comprise:
determining the first request triggers execution of the first one of the plurality of third-party code pieces by matching the first zone to a predetermined matching pattern that associates the first one of the plurality of third-party code pieces to the predetermined matching pattern.

19. The compute server of claim 15, wherein the compute server is one of a plurality of compute servers that are each anycasted to a same IP address, and wherein the compute server receives the first request because it is a closest one of the plurality of compute servers to the client device as determined by an anycast implementation.

20. The compute server of claim 19, wherein each of the plurality of compute servers include the plurality of third-party code pieces.

21. The compute server of claim 15, wherein the first one of the plurality of third-party code pieces is provided by an owner or operator of the first zone.

* * * * *